July 1, 1958
H. L. SOLIE
2,840,908
CHURNS
Filed Nov. 26, 1954
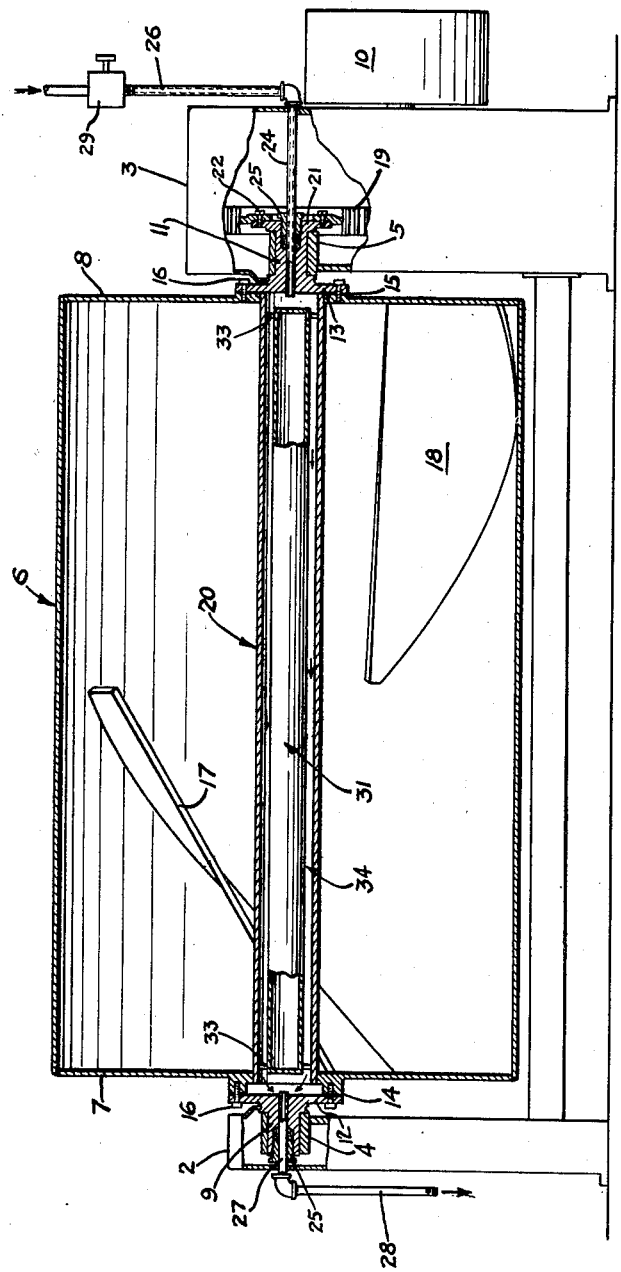
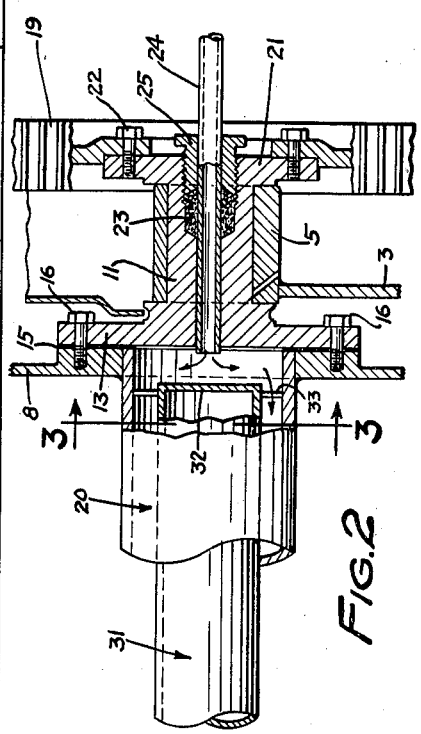
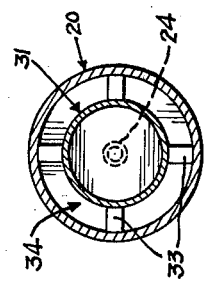
INVENTOR.
HAROLD L. SOLIE
BY
Paul, Moore + Dugger
ATTORNEYS

United States Patent Office 2,840,908
Patented July 1, 1958

2,840,908
CHURNS

Harold L. Solie, Minneapolis, Minn.

Application November 26, 1954, Serial No. 471,304

2 Claims. (Cl. 31—34)

This invention relates to new and useful improvements in churns, generally, and more particularly to combined churns and butter workers.

In the operation of a combined churn and butter worker, cream is first introduced into the churn, and the churn is then rotated to agitate the cream until the emulsion is broken and the butter fat globules have coalesced to the desired granular size. Rotation of the churn is then temporarily interrupted to allow the buttermilk to be drained from the churn, after which water is introduced into the churn to wash the butterfat globules. Rotation of the churn is then resumed to work the butterfat globules into a solid homogeneous mass. Tests are then taken to determine the amounts of water, salt and coloring matter which must be added to the mass to obtain the desired composition in the finished butter. After the required portions of water, salt and coloring matter have been added to the mass, the churn is again rotated until such added materials have been thoroughly and uniformly intermixed with the mass of butter in the churn to produce butter having the desired composition and texture.

In the operation of churns, as now commonly constructed, the temperature of the butter may rise during the initial working thereof, caused by friction resulting from the tumbling action of the butter within the churn. Frequently such temperature rises may be sufficiently rapid to cause difficulty in obtaining thorough incorporation of the required moisture and salt, whereby it may be most difficult to obtain the desired butter composition and texture. It is therefore highly desirable that means be provided for controlling such temperature rise in the butter during the initial working thereof.

An important feature of the present invention, therefore, is to mount a fluid circulating member within the churn through which a cooling agent, such as chilled water, may be circulated during the initial butter-working operation of each batch of butter, said member being so positioned that the butter intermittently engages the chilled surface thereof, whereby the operator may readily and conveniently control the temperature rise of the butter to assure uniform intermixing of the various constituents thereof, with the resultant production of a finished product having the desired composition and texture.

A further object of the invention is to provide, in combination with a churn comprising a rotatably mounted cylindrical drum, an elongated tubular member extending lengthwise through the drum and having its ends secured to the end walls of the drum and communicating with fluid circulating conduits, whereby a cooling agent such as chilled water may be circulated through said elongated member during the initial butter-working operation.

A further and more specific object of the invention is to provide a churn comprising a horizontally disposed cylindrical drum having imperforate end walls, and axially aligned trunnions being secured to said end walls and rotatably received in suitable bearings provided in a supporting structure, and an elongated tubular member being axially mounted within the drum and having its terminals secured to the end walls of the drum, and fluid circulating conduits having end portions extending axially through said trunnions and communicating with the interior of said elongated tubular member, whereby a suitable cooling agent may be circulated through said elongated member during the initial butter-working operation of the drum, said tubular member being so arranged within the drum that the butter carried upwardly by the usual flights or vanes within the drum is constantly being precipitated onto the cool exterior surface of said tubular member, whereby any tendency of the temperature of the butter to rise as a result of friction caused by the tumbling action of the butter is within the control of the operator at all times.

Other objects of the invention reside in the simple and inexpensive construction of the invention; in the provision of an elongated tubular fluid circulating member within a churn, the ends of which are secured to the end walls of the churn drum, whereby said tubular member becomes, in effect, an integral part of the drum; in the unique manner of connecting the fluid circulating conduits to the ends of said elongated tubular member to establish fluid circulation therethrough, the end portions of said conduits being received in axial bores provided in the trunnions secured to the end walls of the churn; in the means provided within said elongated tubular member for maintaining maximum liquid flow adjacent the wall thereof, thereby to increase the cooling effect of said member upon the contents of the churn contacting the exterior surface thereof during operation of the churn; in the provision of suitable packing means in said trunnions for preventing leakage of the cooling liquid therefrom; and in the provision of a commercial churn having means therein for controlling the temperature of the butter during the initial working thereof, said means comprising no parts which are movable relative to the churn drum.

These and other objects of the invention and the means for their attainment will be more apparent from the following description taken in connection with the accompanying drawings.

In the accompanying drawings there has been disclosed a structure designed to carry out the various objects of the invention, but it is to be understood that the invention is not confined to the exact features shown, as various changes may be made within the scope of the claims which follow.

In the drawings:

Figure 1 is a longitudinal sectional view of a conventional churn comprising a horizontally mounted rotary drum showing the invention embodied therein;

Figure 2 is an enlarged detail sectional view of the drive end of the churn drum, and showing the member provided within the elongated tubular member for maintaining maximum liquid flow adjacent the wall thereof; and Figure 3 is a cross-sectional view on the line 3—3 of Figure 2, showing the means provided for axially supporting the inner annular space-forming member within the elongated tubular member.

In the selected embodiment of the invention herein disclosed, there is illustrated in Figure 1, for purposes of disclosure, a churn comprising a supporting structure including spaced supporting pedestals 2 and 3 provided with bearings 4 and 5, respectively. A cylindrical drum 6 comprising end walls 7 and 8 is rotatably mounted between the pedestals 2 and 3. Secured to the end walls 7 and 8 of the drum are a pair of trunnions 9 and 11, respectively, which are rotatably received in the bearings 4 and 5, as clearly illustrated in the drawing. The trunnions are shown provided with circular flanges 12 and 13, respectively, seated against and secured to annular seats 14 and 15 of the end walls of the churn by bolts 16. Suitable packings are provided between the seats 14 and 15 and their respective flanges 12 and 13 to prevent leakage of the cooling agent from between said parts.

An important feature of the present invention resides in the means provided for controlling the temperature of the contents of the churn drum 6 during the churning and butter-working operations. As best illustrated in Figure 1, an elongated, tubular member 20 is mounted within the drum 6 and is preferably axially aligned with the trunnions 9 and 11. The ends of the elongated member 20 are snugly fitted into apertures provided in the end walls of the churn and secured in said apertures in a manner to prevent leakage of the contents of the churn around the ends of said tubular member 20. The tubular member thus becomes, in effect, an integral part of the drum and rotates synchronously therewith.

Suitable flights or vanes 17 and 18 are shown secured to the interior wall of the cylindrical drum 6 for initially agitating the cream and subsequently working the butter, as is well known. In the initial operation of the churn, the cream is thoroughly agitated to provide a homogeneous mixture, and such operation continues until the "break" occurs, or until the butterfat globules coalesce to the desired granular size. Rotation of the churn may then be temporarily interrupted to permit the buttermilk to be drained from the churn in the usual manner.

When the churning cycle has been completed, rotation of the churn may again resume to work the butterfat globules into a homogeneous mass or body. Tests are then taken of the partially completed butter to determine the necessary quantities of water, salt and coloring matter which must be introduced into the mass of butter to produce a product of uniform composition and quality.

After the necessary quantities of moisture, salt and coloring matter have been introduced into the mass of butter, the churn is again rotated to effect thorough and complete intermixing and incorporation of such constituents until the mass of butter in the churn attains the desired composition and texture to produce a high quality product.

During such intermixing of the added butter constituents, the mass of butter within the churn is continually being precipitated onto the chilled periphery of the tubular member 20 by the action of vanes 17 and 18, which thereby prevents the temperature of the butter from rising above a predetermined figure during such butter-working operation. The tubular member 20 is preferably comparatively large in diameter to provide an enlarged cooling surface onto which the butter is continually being precipitated by the tumbling action of the butter within the churn.

A suitable door opening, not shown, is provided in the cylindrical wall of the drum 6 to permit convenient inspection and removal of the butter from the churn. Such door opening and its closure is of conventional construction, and it is therefore deemed unnecessary to herein illustrate the same. Suitable sealed inspection openings may also be provided in the end walls of the churn, if desired, as will be understood.

The novel butter cooling member 20 herein disclosed is extremely simple and inexpensive in construction. When used in the construction of a churn drum, the end walls of the drum may be axially bored to receive the ends of the tubular member 20 which are fixedly secured in said bores to provide leak-proof connections between the end walls of the churn and the ends of the tubular member 20, as hereinbefore stated. The churn as herein disclosed is shown having a gear wheel 19 secured to a terminal flange 21 of trunnion 11 by such means as bolts 22. The gear 19 meshes with a drive pinion, not shown, which may be operatively connected to a pulley 10, shown in Figure 1. Pulley 10 may be driven from any suitable source of power.

Bearings 4 and 5 of trunnions 9 and 11, respectively, are preferably split to facilitate assembling. The ends of trunnions 9 and 11 are shown bored to receive a suitable packing material 23 which may be compressed against the walls of conduits 24 and 27 by suitable packing glands 25. Conduit portion 24 is in communication with pipe 26, and conduit portion 27 is in communication with a fluid circulating pipe 28, whereby a suitable cooling agent may be circulated through the tubular member to maintain the contents of the churn within a predetermined high temperature.

During the butter-working operation of the churn, cold water may be constantly circulated through the tubular member 20. A valve 29 may be provided in pipe 26 for increasing or decreasing the flow of chilled water through the tubular member 20 to effect the desired cooling of the butter.

To chill the wall of the tubular member 20 as much as possible, means is provided within said member for maintaining maximum fluid circulation adjacent said wall. Such means is shown comprising cylindrical member 31, the outside diameter of which is relatively smaller than the inside diameter of member 20 so that a relatively small annular fluid passage is provided and a maximum cooling effect is accomplished with a minimum and given amount of coolant fluid passed through the annular restricted fluid passage. The ends of member 31 are closed, as shown at 32, to prevent entrance of the liquid thereinto, and it is axially supported within member 20 at each end thereof to provide an annular fluid-circulating passage 34 extending the length of member 20, as best shown in Figure 1.

It will thus be seen that the walls of members 20 and 31 cooperate to provide the annular fluid-circulating passage 34, whereby the movement of the chilled cooling medium through said passage is in direct contact with the wall of member 20 throughout its extent. The wall of member 20 may thus be maintained at the lowest temperature obtainable from the supply of chilled water delivered to said member from conduit 26. In other words, by directing the flow of the chilled water through member 20 adjacent the wall thereof, as above described, the drop between the temperature of the chilled water delivered to member 20 from conduit 26 and the exterior surface of the wall of member 20 will be relatively small.

The invention herein disclosed presents the utmost in simplicity, and does not comprise any parts which are relatively movable within the churn. The elongated tubular member 20 is securely fixed to the end walls 7 and 8 of the churn, and thus becomes, in effect, an integral part of the drum 6, as clearly illustrated in Figure 1.

The foregoing detailed description has been given for clearness of understanding only, and no unnecessary limitations should be understood therefrom, but the appended claims should be construed as broadly as permissible in view of the prior art.

I claim as my invention:

1. In a batch-type butter making churn, a pair of spaced bearing pedestals, a cylindrical drum having end walls, trunnions secured to said end walls and rotatably received in said pedestals, a plurality of spiral vanes secured to the inner surfaces of the cylindrical and end walls of said drum for agitating the contents of the churn, an elongated tubular baffle member axially disposed in said drum and having its ends secured to the end walls of the drum in leaktight relation thereto, an elongated closed cylindrical member axially mounted in said tubular baffle member with its outer cylindrical wall surface spaced a relatively small distance inwardly from the inner wall surface of said tubular baffle member and cooperating therewith to provide an annular restricted fluid circulating passage extending the length of the churn, and fluid circulating conduit means in communication with each end of said tubular baffle member, chilled fluid circulating through said baffle member to chill the outer cylindrical wall surface of the baffle member during the butter working portion of each cycle of operation, whereby the attendant may readily control the temperature of the butter being worked to assure uniform intermixing of the various constituents thereof.

2. A batch-type butter making churn according to claim 1, wherein valve means is provided in said fluid circulating conduit means for controlling fluid circulation through said annular restricted fluid circulating passage.

References Cited in the file of this patent

UNITED STATES PATENTS

| | | |
|---|---|---|
| 544,719 | Bingham | Aug. 20, 1895 |
| 2,266,032 | Harrington | Dec. 16, 1941 |
| 2,268,905 | Schaub et al. | Jan. 6, 1942 |
| 2,281,944 | Miller et al. | May 5, 1942 |
| 2,306,602 | Harrington | Dec. 29, 1942 |

FOREIGN PATENTS

| | | |
|---|---|---|
| 116,663 | Switzerland | Nov. 1, 1926 |
| 257,566 | Great Britain | Jan. 27, 1927 |